United States Patent [19]

Weck et al.

[11] 4,073,982

[45] Feb. 14, 1978

[54] NEWSPRINT COUPON SEPARATOR

[76] Inventors: Friedrich J. Weck, 1339 S. Seventh Ave., Hacienda Heights, Calif. 91745; James Hunkins, 13001 Aclare Place, Cerritos, Calif. 90701; Samuel J. Rinsler, 712 N. Kings Road, Los Angeles, Calif. 90069

[21] Appl. No.: 596,999

[22] Filed: July 18, 1975

[51] Int. Cl.² .................. B05D 3/10; B41M 7/00; B32B 29/06
[52] U.S. Cl. .................. 427/270; 101/426; 156/83; 156/155; 427/288; 427/289; 427/308; 427/395; 428/43; 428/211
[58] Field of Search .............. 427/288, 308, 256, 261, 427/270, 289, 395; 428/43, 211; 101/426; 156/83, 155, 344

[56] References Cited

U.S. PATENT DOCUMENTS

| | | | |
|---|---|---|---|
| 1,780,793 | 11/1930 | McLaurin | 427/288 X |
| 1,905,061 | 4/1933 | Sax | 427/288 X |
| 2,387,914 | 10/1945 | Kienninger | 427/288 X |
| 2,518,607 | 8/1950 | Erickson | 427/288 X |
| 3,006,793 | 10/1061 | Wheeler | 428/43 X |
| 3,048,100 | 8/1962 | Livingstone | 101/426 |
| 3,085,898 | 4/1963 | Vaurio | 427/288 X |
| 3,563,839 | 2/1971 | Divis | 428/43 |
| 3,669,814 | 2/1970 | Faltin | 428/43 |

*Primary Examiner*—Harold Ansher
*Attorney, Agent, or Firm*—Lyon & Lyon

[57] ABSTRACT

A weakening composition printed onto newsprint in a predetermined pattern causes the newsprint to weaken within a short period of time along the lines of the pattern so that the newsprint tears preferentially along the outline of the pattern.

7 Claims, No Drawings

NEWSPRINT COUPON SEPARATOR

This invention relates to the treatment of paper, and in particular newsprint, so as to form a predetermined pattern of weakened lines in the paper whereby a section may be separated from the paper much as a single stamp is removed from a sheet of stamps.

Most major metropolitan newspapers are printed with high speed rotary presses. The newsprint is supplied to the presses in large rolls, and a web of newsprint is pulled through the presses at speeds which often exceed 30 or 40 miles per hour. Under these conditions any imperfections or weaknesses in the newsprint, which may cause the newsprint to rip in the press, causes an immediate breakdown in the printing operation. The printing fluid or ink must be sufficiently viscous so that the centrifugal force of the rotating printing presses will not throw the printing ink off of the rollers. The printing inks which are utilized must dry by sorption. Since it only takes a few seconds for the newsprint to pass from the feed roller through the folding station, the printing ink must dry almost instantaneously to a state where it will not smear.

One technique which is commonly used in merchandising of food and other retail itmes is to insert a coupon into a newspaper. The coupon is to be torn out by the reader of the newspaper and taken to the store where it is redeemed for the goods identified in the coupon. The coupons are printed onto the newsprint and thus become part of the newspaper. Removing these coupons from the newspaper presents a problem. In order to remove the coupon with a clean straight edge it is necessary to use an implement, such as a scissors or a razor blade. If such implements are not immediately at hand, the sale is in many cases lost because the coupon is not clipped out and redeemed. If an effort is made to tear the coupon out without using a cutting instrument, the resultant piece of newsprint has ragged edges and is of an irregular shape and proportion. often the coupon tears at the wrong location and is mutilated to the point where it is simply discarded rather than being used for its intended purpose. When coupons which have been severed from newsprint are presented for redemption at the store, their mutilated condition and irregular shape often presents a very considerable problem in sorting, counting, and handling. These coupons are often sorted and counted by hand so that there is a long delay between the time when they are presented to the store for redemption and the time when the store can close its books on the transaction.

According to the present invention the problems attending the utilization and accounting for coupons which are printed as a part of a newspaper are solved by printing the coupons in such a way that the newsprint preferentially tears along the outline of the coupon, and the coupon itself bears identifying indicia which renders it processable by automatic means.

The present invention includes a composition which is printed onto the web of newsprint or other paper in a predetermined pattern. The composition is of such a nature that it causes the web of paper to weaken within a short period of time wherever the composition has been printed onto it. The weakening does not take place instantaneously because an instantaneous weakening might result in causing the web to rupture as it moves through the high speed printing presses. This would result in disrupting the printing operation. For this reason, the weakening action must be delayed for at least a few seconds to allow the web of paper to pass completely through the printing press. The weakening action must last for at least several days in order to serve its intended function. The newsprint weakening composition must be fluid in nature so that it can be applied to the newsprint in the same way that printing ink is applied to the newsprint. The weakening composition preferably has approximately the same physical characteristics as printing ink so that it can be handled and applied with existing printing equipment using conventional techniques. The weakening composition must be sufficiently sorbable by the paper so that it is instantaneously dried to such a degree that it will not smear. The weakening composition should accept pigmentation so that it can print not only a line which will become weakened but also one which is visible to the eye. In general, the viscosity of the weakening agent can be varied by the use of thickening agents to provide a composition which can be used interchangeably with conventional printing press inks in conventional printing press equipment. In some instances these compositions have thixotropic characteristics. When these compositions are intended for use in high speed rotary presses, the viscosity should be sufficient to prevent the composition from being thrown off the rollers by centrifugal force.

In general the weakening compositions include at least water, one or more hygroscopic materials, and one or more wetting agents. Generally, it is desirable to include a thickening agent to increase the apparent viscosity of the composition to those values which approximate those possessed by printing inks which are used in the same presses. Other materials; such as, corrosion inhibitors, pigments, solvents, hydrotrops, foam suppressors, and the like, may be included. One included material may perform more than one function; for example, a thickener may also be a humectant and a lubricant.

The preferred paper weakening compositions in general provide and maintain moisture in the paper for an extended period of time. The weakening of the paper is performed at least in part by the moisture. Other agents, such as alkaline or acid materials or lubricants, may be utilized if desired. These additional materials also contribute to the weakening of the paper when they are utilized. The water and any additional weakening agents require at least a few seconds to act on the paper before any detectable weakening occurs. The water causes the fibers in the paper to swell and separate. The other materials attack the binders or even the fibers so as to weaken the web and cause it to separate. The lubricants tend to facilitate the separation of the fibers.

In general, one preferred group of weakening compositions may be described as humectants; that is, they both provide and maintain a sufficient amount of moisture in the paper for an extended period of time so that the paper is thereby weakened and the binding of the fibers washed aside. The humectant activity of the composition may be provided by the presence of hygroscopic materials or by the presence of materials which prevent moisutre from escaping or by a combination of such materials. The humectant composition must also include wetting agents to enhance its sorption characteristics.

In general, the ingredients which are utilized in the weakening composition should be substantially noncorrosive so that they do not damage the presses and associated equipment. For this reason, highly alkaline and Preferably, the materials used in the manufacture of the weakening compositions are nontoxic and nonallergenic. Printed material, and in particular newspapers, are disseminated widely throughout the population so that care must be taken in the choice of materials to avoid substances which might cause adverse reactions to members of the general public. For thisreason, highlyalkaline and acid materials are generally not preferred.

Generally it is desired that the weakening composition leave an imprint which is visible to the eye as well as weakening to the paper. The weakening composition preferably is of a characteristic which permits it to strike through the paper; that is, after it has been printed on the paper, it is possible to detect the presence of the weakening composition on both sides of the paper, thus insuring that the paper is weakened through its entire thickness. This characteristic is conveniently described as strike through. This characteristic of strike through is, however, very undesirable for printing ink because a strike through of the visible indicia which is printed on one side of the paper so that it is readily detected by the eye renders the other side of the paper unusable for printing purposes.

When the weakening composition is desired or required to leave a visible indication on one side of the paper, it is preferably pigmented with conventional fine particulate solid phase materials; such as, for example, carbon black, red lead, iron oxide (red), chrome green, copper or cobalt blues, benzidine yellow, triphenylmethane derivatives, metal organic complexes, and the like. These solid phase pigmentation materials can be used such that they do not strike through the paper even though the weakening composition vehicle in which they are carried does strike through. These pigmentation materials remain at or close to the surface of the paper upon which they are imprinted.

The concentration of the pigmentation material generally determines whether at a given rate of application it will strike through the paper. In general, the concentration of the pigment is less than approximately 2 percent and preferably less than approximately 0.1 weight percent of the total composition, although other concentrations may be used as desired.

The characteristic of selective or differential strike through between the pigment and the weakening composition vehicle generally distinguishes these compositions from other printing inks and compositions.

The capacity of the vehicle to strike through the paper, and in particular newsprint, generally depends in large part for any given rate of application upon the characteristics and concentration of the wetting agent which is included in the formulation. Wetting agents which possess high wetting and spreading capability together with low foaming and paper swelling characteristics are generally preferred. Typical preferred wetting agents which exhibit high wetting and spreading characteristics together with low foaming properties include, for example, amine polyoxyethylene-glycol condensates containing from about 8 to 14 ethylene oxide units. Such materials are commercially available, for example, under the trade designation "Triton CF32" for Rohm & Haas. Other preferred wetting agents which exhibit high wetting and spreading characteristics include, for example, polyoxyethylene sorbitan esters of fatty acids, which fatty acids contain from 14 to 18 carbon atoms, polyoxyethylene oleyl ethers, polyoxyethylene alkyl amines, polyoxyethylene alkyl sulfonates, wherein there are from about 10 to 35 ethylene oxide units, xylene sulfonic acid, and the like.

The wetting agent which is employed to enhance the sorbability of the composition into the paper is a compound which lowers the surface tension of water against air at least below 72 dynes per centimeter and preferably below approximately 30 dynes per centimeter at 20° centigrade.

Among wetting agents useful in the composition are non-ionic, anionic or cationic, or amphoteric wetting agents.

In general, suitable nonionic agents are those which may be produced by the introduction of an alkylene oxide group into an organic hydrophobic compound or group having an aliphatic or aromatic structure. The hydrophobic organic group generally contains at least 8 carbon atoms and up to about 30 carbon atoms. Condensed with the hydrophobic group are at least 5 and preferably up to about 50 alkylene oxide groups. It is preferred to use the polyoxyethylene condensates derived from ethylene oxide. Among the nonionic detergents, it is preferred to use the polyalkylene oxide condensates of an alkyl phenol, such as the polyoxyethylene ethers of alkyl phenols having an alkyl group of at least about six, and usually about 8 to 12 carbons, and an ethylene oxide ratio (No. of moles per phenol) of about 7.5, 8.5, 11.5 or 20, though the number of ethylene oxide groups will be usually from about 8 to 18. The alkyl substituent on the aromatic nucleus may be di-isobutylene, diamyl, polymerized propylene, dimerized $C_6$-$C_7$ olefin, and the like.

Other suitable wetting agents are the polyoxyalkylene esters of organic acids, such as the higher fatty acids, rosin acids, tall oil acids, or acids from the oxidation of petroleum, et cetera. These polyglycol esters will contain usually from about 12 to about 30 moles of ethylene oxide or its equivalent and about 8 to 22 carbons in the acyl group. Suitable products are refined tall oil condensed with 16 or 20 ethylene oxide groups, or similar polyglycol esters of lauric, stearic, oleic acids, etc.

Additional nonionic wetting agents are the polyalkylene oxide condensates with higher fatty acid amides, such as the higher fatty acid primary amides, mono- and di- ethanolamides. Suitable agents are coconut fatty acid amide condensed with about 10 to 50 moles of ethylene oxide. The fatty acyl group will have similarly about 8 to 22 carbons, and usually about 10 to 18 carbon atoms, in such products. The corresponding sulfonamides may be used also if desired.

Other suitable polyether nonionic wetting agents are the polyalkylene oxide ethers of high aliphatic alcohols. Suitable fatty alcohols having a hydrophobic character, preferably Possessing 8 to 22 carbons, are lauryl, myristyl, cetyl, stearyl, and oleyl alcohols which may be condensed with an appropriate amount of ethylene oxide, such as at least about 6, and preferably about 10 to 30 moles. A typical product is oleyl alcohol condensed with about 12, 15 or 20 moles of ethylene oxide. The corresponding higher alkyl mercaptans or thioalcohols condensed with ethylene oxide are suitable also. The water-soluble polyoxyethylene condensates with hydrophobic polyoxypropylene glycols may also be employed.

Further suitable nonionic materials are the higher fatty acid alkanolamides; such as, the monoethanolamides, diethanolamides, and isopropanolamides wherein the acyl radical has about 10 to 14 carbon atoms and amine oxides. Examples are coconut (or equivalent lauric), capric and myristic diethanolamide, monoethanolamide and isopropanolamide, dodecyl dimethyl amine oxide and dimethyl acetoxyalkylamine oxide where alkyl is $C_{11}$–$C_{14}$.

Other suitable agents are anionic aromatic materials, e.g., water-soluble higher alkyl aryl sulfonates particularly those having from 8 to about 15 carbon atoms in the alkyl group having a mononuclear aryl nucleus, such as toluene, xylene, or phenol. The higher alkyl substituent on the aromatic nucleus may be branched or straight-chained in structure, examples of such group being nonyl, dodecyl, and pentadecyl groups derived from polymers of lower mono-olefins, decyl, keryl, and the like.

Illustrative of suitable aliphatic anionic agents are the normal and secondary higher alkyl sulfate detergents, particularly those having about 8 to 15 carbons in the fatty alcohol residue, such as lauryl (or coconut fatty alcohol) sulfate. Other suitable detergents are the sulfuric acid esters of polyhydric alcohols incompletely esterified with higher fatty acids, e.g., oleic acid ester of isothionic acid; the higher fatty acid (e.g., coconut) ethanolamide sulfate; the higher fatty acid amide of amino alkyl sulfonic acids, e.g., lauric acid amide of taurine; and the like.

Typical specific examples are: the sodium salt of a sulfate ester of an alkylphenoxypoly (ethyleneoxy) ethanol, the ammonium salt of this sulfate ester, sodium methyl oleyl taurate, sodium alkyl naphthalene sulfonate, alkyl acyl sodium sulfonate, sodium tetrahydronaphthalene sulfonate, sodium alkyl aryl sulfonate, alkyl amido sulfate, cocomonoglyceride sulfate, dodecylbenzene sodium dodecyl diphenyl oxide disulfonate, sulfonated castor oil, polyethoxyalkyl phenol sulfonate triethanolamine salt, sodium triethanolamine alkyl aryl sulfonate, magnesium lauryl sulfate, potassium lauryl sulfate, sodium lauryl ether sulfate, ammonium lauryl ether sulfate, sodium tallow sulfate, dodecylbenzene sodium sulfonate, oleyl methyl tauride, ammonium aluryl sulfate, amide sulfonate, and the like.

Other suitable synthetic detergents are cationic agents such as the amines, particularly primary fatty amines; such as, lauric amine, myristic amine, palmitic amine, stearic amine, oleyl amine, linoleyl amine, coco amine, and tallow amine. Also N-fatty propylene diamine and heterocyclic tertiary amines as well as fatty halides, e.g., stearyl dimethyl benzene ammonium chloride, dodecylbenzene chloride, lauryl pyridinium chloride and sulfates, e.g., lauryl pyridinium bisulfate can be used.

In general, the wetting agents are provided in an amount just sufficient to insure that the composition will be detachable on both sides of the paper to which it is applied for a given predetermined rate of application. In general, the concentration of the wetting agent ranges from about 0.1 to 35 and preferably from about 2 to 15 weight percent of the total composition.

In general, suitable humectants include those organic or inorganic materials which tend to maintain the portion of the paper web in which they are sorbed in a slightly moist condition so that the web is softened, and the fibers are caused to unfelt. Suitable humectants include, for example, phosphoric acid, glycerol, monoglycerides of fatty acids wherein the fatty acids have from about 8 to 18 carbon atoms, liquid dicarboxylic acid glycerol copolymers wherein the dicarboxylic acid includes from 4 to about 8 carbon atoms including fumaric acid-glycerol copolymer, dicarboxylic acid polyoxyalkyleneglycol esters wherein the polyoxyalkyleneglycol contains from about 5 to 35 alkylene oxide groups such as ethylene oxide and propylene oxide, phosphoric acid-polyoxyethyleneglycol esters having molecular weights from about approximately 500 to 2500, glycerol phosphate esters produced by reacting from about 1 to 2 glycerol to 1 phosphoric acid, propylene glycol, d-sorbitol, magnesium chloride, magnesium perchlorate, potassium bisulfate, potassium hydroxide, and the like.

A great variety of compositions will function to accomplish the weakening of the paper along a predetermined line or in a predetermined location. The particular formulation of weakening compositions is not particularly critical provided that the composition is capable of striking through the paper and is capable of weakening the paper within a few hours and maintaining it in that weakened condition for at least several days. In general, compositions which are capable of performing this function include a humectant, a wetting agent, water, and a thickener which may be the same as or different from the humectant and wetting agent. The thickener prevents the composition from spreading too far laterally through the paper as well as permitting the composition to be applied in conventional printing press equipment.

Hydrotrops are often included with wetting agents so as to help bind the wetting agent to the water. Suitable hydrotrops for use in the present weakening compositions include, for example, toluene sulfonic acids, butyl cellosolve, hexylene glycol, sodium toluene sulfonic acid, cellosolve acetate, cellosolve, hexane diol, and the like.

In the following examples all parts and percentages are by weight unless otherwise indicated. The following specific examples are submitted for purposes of illustration and not limitation.

EXAMPLE I

In a preferred weakening composition, according to the present invention, an admixture is prepared containing 35 parts by weight of glycerol, 35 parts by weight of polyoxyethylene-glycol having a molelcular weight of about 500, 30 parts by weight of water, 6 parts by weight of Cabosil M-5 thickener (a fumed silica powder having a particle size in the colloidal range) and 2 parts by weight of an amine polyoxyethyleneglycol condensate containing about 10 ethylene oxide units. In this formulation the glycerol and the polyoxyethyleneglycol function as humectants; the Cabosil M-5 is a thickener; and the amine polyoxyethyleneglycol condensate is a wetting agent. When this composition is printed onto 32-pound newsprint stock, the newsprint becomes very considerably weakened along the line where the composition was printed. The composition is detectable on both sides of the newsprint. The tearability of the newsprint is measured by clamping one end of a strip of newspaper which has had a line of this weakening composition printed across it so that the paper hangs vertically with the printed line extending horizontally completely across the newsprint. A second clamp is attached to the lower edge of the newsprint with provisions being made to attach a spring scale to the clamp. The spring scale is carefully pulled by hand until the weight is sufficient to cause the newspaper to rip. Utilizing the composition of this example at an application rate just sufficient to detect the strike through of the composition on the reverse side of the newsprint, it required 1 to 3 pounds to rip different samples of the newsprint. Equivalent newsprint samples which had not been treated with the composition of this example required from 10 to 12 pounds to cause them to rip. The rip tests were carried out on newsprint samples which had been treted with the composition of this example and allowed to weaken for about 1 hour. Samples of newsprint which were treated with the composition of this invention and then set aside for differing periods of time required from 1 to 3 pounds of weights to cause them to rip at time intervals after treatment ranging from 5 hours to 3 weeks.

The composition of this example was used to print rectangular designs on samples of newsprint. About 1 hour after printing, it was found that the rectangular sections of newsprint within the boundaries of the rectangular printed patterns could be easily separated from the remainder of the sheet of newsprint. The newsprint tore preferentially along the lines defined by the printed composition.

The addition of carbon black to the composition of this example resulted in the printing of a line of the newsprint which was visible on one side but not on the other even though the composition was applied at a rate such that it just struck through the paper. The effectiveness of the composition was not changed by the addition of the carbon black. Likewise, the addition of red lead resulted in the printing of a red line which did not strike through the paper. The composition of this example is a suitable vehicle for these pigments.

Microscopic examination of the newsprint several hours after the composition of this example has been applied to it reveals that the fibers of the paper have become unfelted to a considerable extent where the composition has attacked them. A slight tackiness is felt when a finger is rubbed over the line where the composition of this example is printed onto the newsprint. The portion of the paper which has sorbed the composition is slightly moist. The paper appears to be slightly swelled indicating that the composition has caused the fibers to unfelt.

Utilizing the composition of this example in a proof press with a variety of different styles of lines shows that the composition of this example is effective with light lines, heavy lines, and broken lines. The tearability of the newsprint increases as the presure setting of the printing press is increased.

EXAMPLE II

In a second preferred weakening composition, 10 parts by weight of 85 percent phosphoric acid is admixed with 3 parts by weight of glycerol, 3 parts by weight of triethanolamine, 20 parts by weight of water, 1 part by weight of Cabosil M-5 thickener, and 0.55 parts by weight of amine polyoxyethyleneglycol condensate containing about 10 ethylene oxide units.

In the weakening composition of this example, the phosphoric acid and glycerol function as humectants; the triethanolamine functions to reduce the acidity of the composition; and the amine polyoxyethyleneglycol condensate is a wetting agent. The Cabosil performs the function of a thickening agent.

The composition of this invention, when applied to 32-pound newsprint stock as described above in Example I, results in a product with a rip strength of from 1 to 3 pounds, determined as described in Example I.

The substitution of polyoxyethyleneglycol having a molecular weight of from about 600 to 1000 for the Cabosil in this example produces an effectively thickened composition. Likewise, the use of synthetic gums, such as polyacrylamide or natural gums such as gum arabic, for the Cabosil produces an acceptably thickened composition which can be used in a high speed rotary press to print a line which does not spread excessively through the paper after application.

EXAMPLE III

In the following Table I the weakening compositions A through H are listed. The numerals in each of the columns A through H indicate the grams of the materials which are present in the respective compositions.

TABLE I

|  | A | B | C | D | E | F | G | H |
|---|---|---|---|---|---|---|---|---|
| Polyoxyethylene-nonylphenol (m.w. about 600) | 3 | 5 | 3 | 5 | 1 |  |  |  |
| Coco fatty acid diethanol amide |  |  |  |  |  | 2 |  |  |
| Amine polyoxyethyleneglycol (m.w. about 600) |  |  |  |  |  |  | 1 | 0.5 |
| Toluene sulfonic acid |  | 2 |  |  |  |  |  |  |
| Sodium toluene sulfonic acid |  |  | 2 |  |  |  |  |  |
| $KHSO_4$ | 3 |  |  |  |  |  |  |  |
| Glycerol | 15 | 15 | 20 |  | 12 | 20 | 13 |  |
| Phosphoric acid 85 percent |  | 5 |  |  |  |  |  | 10 |
| KOH |  |  | 3 |  |  |  |  |  |
| Fumaric acid-glycerol copolymer |  |  |  | 20 |  |  |  |  |
| Fumaric acid-polyoxyethyleneglycol ester (m.w. about 600) |  |  |  |  |  | 7 |  |  |
| Phosphoric acid-polyoxyethyleneglycol ester (m.w. about 600) |  |  |  |  |  |  | 11 |  |
| Polyoxyethyleneglycol m.w. 600 |  |  |  |  |  |  | 1.9 |  |
| Cabosil M-5 | 2 | 3 | 2 |  |  |  | 0.9 | 1 |
| Triethanolamine |  |  |  |  |  |  |  | 3 |
| Methanol |  | 0.5 |  |  |  |  |  |  |
| Octanol |  |  |  |  |  | 0.5 |  |  |
| Water | 14 | 22 | 30 | 25 | 12 | 20 | 13 | 20 |

As indicated in the foregoing examples, the compositions generally contain from approximately 20 to 60 weight percent water, from approximately 30 to 60 weight percent humectant, and from about 2 to 15 weight percent wetting agent. Various other materials; such as thickeners, wetting aids, foam depressants, hydrotrops, and the like, are added as the particular formulation may require.

The use of the present compositions does not interfere with the application of a line-type code system to the area of newsprint which is to be separated from the remainder of the sheet of newsprint. Indicia which appears as a line-type code system on the newsprint is machine readable by automated grocery check out systems so as to permit automatic accounting for the information on the newsprint at the check out stand in any grocery store which is equipped with the capability to machine read printed indicia.

The compositions of these examples are susceptible to being colored with conventional pigment coloring agents, such as carbon black and red iron oxide, so as to produce a colored line where the paper is weakened.

The compositions of these examples are particularly effective when they are applied to newsprint, but they are also effective when applied to other papers.

The various materials in these examples may perform more than one function; for example, the fumaric-acid glycerol copolymer in composition D performs the function of humectant and thickener.

The humectant or hygroscopic materials in these compositions should be provided in an amount sufficient to provide enough moisture in the printed on condition to reduce the rip strength of the paper to less than approximately 75 percent and preferably less than about 50 percent of the rip strength of the untreated paper.

What is claimed is:

1. A method of printing paper, integral portions of which are readily hand-detachable from the remainder of the paper along predetermined boundaries, which method comprises:

supplying to a printing press a paper-weakening composition comprising a pigment and a vehicle including substantially non-corrosive humectant, water and a wetting agent;

passing a web of paper through the printing press;

repetitively demarking discrete portions of the paper from surrounding portions thereof with said composition while maintaining the integrity of the web across resulting lines of demarcation; and removing the paper from the press and forming an assembly of the same with other paper in layered relation;

said composition being sufficiently dried prior to the foregoing assembly step to prevent smearing of the pigment upon assembly, yet maintaining a moistened condition along the lines of demarcation following the assembly step so that the paper may subsequently be easily and preferentially torn along the lines of demarcation.

2. A method according to claim 1 wherein said paper is newsprint.

3. A method according to claim 2 wherein the discrete portions so demarked are rectangular.

4. A method according to claim 2 wherein machine detectable indicia are printed on the discrete portions so demarked.

5. A method according to claim 2 wherein the paper weakening composition is applied to the paper at a rate such that the vehicle strikes through the paper, while the pigment does not.

6. A method according to claim 5 wherein the discrete portions so demarked are rectangular.

7. A method according to claim 5 wherein machine detectable indicia are printed on the discrete portions so demarked.

* * * * *